United States Patent
Dong et al.

(10) Patent No.: US 9,906,491 B2
(45) Date of Patent: Feb. 27, 2018

(54) IMPROVING TRANSMISSION EFFICIENCY OF DATA FRAMES BY USING SHORTER ADDRESSES IN THE FRAME HEADER

(71) Applicant: Huawei Device Co., Ltd., Shenzhen (CN)

(72) Inventors: Xiandong Dong, Shenzhen (CN); Zhiming Ding, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 254 days.

(21) Appl. No.: 14/330,238

(22) Filed: Jul. 14, 2014

(65) Prior Publication Data
US 2014/0321449 A1 Oct. 30, 2014

Related U.S. Application Data

(63) Continuation of application No. PCT/CN2013/070139, filed on Jan. 7, 2013.

(30) Foreign Application Priority Data

Jan. 12, 2012 (CN) .......................... 2012 1 0008967

(51) Int. Cl.
*H04L 29/12* (2006.01)

(52) U.S. Cl.
CPC .......... *H04L 61/6072* (2013.01); *H04L 61/20* (2013.01); *H04L 61/2038* (2013.01); *H04L 61/6022* (2013.01)

(58) Field of Classification Search
CPC ............. H04L 61/6072; H04L 61/2038; H04L 61/6022; H04L 61/20
See application file for complete search history.

(56) References Cited

U.S. PATENT DOCUMENTS

| 8,396,064 B2 | 3/2013 | Giesberts et al. |
| 2005/0152358 A1 | 7/2005 | Giesberts et al. |

(Continued)

FOREIGN PATENT DOCUMENTS

| CN | 101056258 A | 10/2007 |
| CN | 101884184 A | 11/2010 |

(Continued)

OTHER PUBLICATIONS

Wentink et al., Apparatus and Methods for Media Access Control Header Compression, U.S. Appl. No. 61/548,419, filed Jan. 9, 2012.*
Partial English Translation and Abstract of Japanese Patent Application No. JP2005260939, Aug. 31, 2015, 40 pages.
Partial English Translation and Abstract of Japanese Patent Application No. JP2006129450, Aug. 31, 2015, 21 pages.

(Continued)

*Primary Examiner* — Ian N Moore
*Assistant Examiner* — Justin T Van Roie
(74) *Attorney, Agent, or Firm* — Conley Rose, P.C.

(57) ABSTRACT

A data communications method, apparatus, and system are provided. The method includes: sending an association request message to an access point; receiving an association response message sent by the access point, where the association response message includes an association identifier; generating a data frame, where a format of the data frame is a simplified frame format, and a frame header of the data frame includes a source address and a destination address, where the length of the source address is shorter than the length of a Media Access Control (MAC) address, and the source address includes the association identifier, the association identifier and a multicast unicast indicator, the association identifier and a data type, or the association identifier, the data type, and the multicast unicast indicator; and sending the data frame to the access point.

17 Claims, 5 Drawing Sheets

(56) References Cited

U.S. PATENT DOCUMENTS

| | | | |
|---|---|---|---|
| 2005/0249136 A1* | 11/2005 | Fischer | H04L 29/12254 370/310 |
| 2005/0249244 A1 | 11/2005 | McNamara et al. | |
| 2006/0088019 A1 | 4/2006 | Liebsch | |
| 2007/0153793 A1 | 7/2007 | Jiang | |
| 2007/0280258 A1* | 12/2007 | Rajagopalan | H04L 45/245 370/395.3 |
| 2009/0092076 A1 | 4/2009 | Zheng et al. | |
| 2010/0046443 A1 | 2/2010 | Jia et al. | |
| 2010/0061350 A1* | 3/2010 | Flammer, III | H04L 1/1628 370/338 |
| 2010/0142560 A1 | 6/2010 | Sharivker et al. | |
| 2010/0202347 A1 | 8/2010 | Sridhara et al. | |
| 2011/0182223 A1* | 7/2011 | Patel | H04L 29/12254 370/311 |
| 2013/0022032 A1 | 1/2013 | Taghavi et al. | |

FOREIGN PATENT DOCUMENTS

| | | | |
|---|---|---|---|
| GB | 2415855 | A | 1/2006 |
| JP | 2005260939 | A | 9/2005 |
| JP | 2006129450 | A | 5/2006 |
| JP | 2007037196 | A | 2/2007 |
| JP | 2007184938 | A | 7/2007 |
| JP | 2012517780 | A | 8/2012 |
| JP | 2014508458 | A | 4/2014 |
| JP | 2014520426 | A | 8/2014 |
| KR | 20090083699 | A | 8/2009 |
| SG | 194891 | A1 | 12/2013 |
| WO | 2010057241 | A1 | 5/2010 |
| WO | 2010074385 | A1 | 7/2010 |
| WO | 2010093819 | A1 | 8/2010 |
| WO | 2012103381 | A1 | 8/2012 |
| WO | 2012159082 | A2 | 11/2012 |

OTHER PUBLICATIONS

Partial English Translation and Abstract of Japanese Patent Application No. JP2007037196, Aug. 31, 2015, 49 pages.

Partial English Translation and Abstract of Japanese Patent Application No. JP2007184938, Aug. 31, 2015, 32 pages.

Partial English Translation and Abstract of Japanese Patent Application No. JP2012517780, Aug. 31, 2015, 51 pages.

Partial English Translation and Abstract of Japanese Patent Application No. JP2014508458, Aug. 31, 2015, 48 pages.

Partial English Translation and Abstract of Japanese Patent Application No. JP2014520426, Aug. 31, 2015, 131 pages.

Foreign Communication From a Counterpart Application, Japanese Application No. 2014-551509, Japanese Office Action dated Jul. 7, 2015, 5 pages.

Foreign Communication From a Counterpart Application, Japanese Application No. 2014-551509, English Translation of Japanese Office Action dated Jul. 7, 2015, 6 pages.

"Considerations on short packet transmission overhead," IEEE802.11-11-11-1254-00-00ah, Sep. 18, 2011, 8 pages.

Vanzago, L., et al., "Overview on 802.15.4/Zigbee," STMicroelectronics, DICO, May 2006, 70 pages.

Foreign Communication From a Counterpart Application, European Application No. 13735875.0, Extended European Search Report dated Feb. 11, 2015, 6 pages.

"Proposed Specification Framework for TGah," IEEE 9802.11-yy/xxxxr0, Jun. 2011, 10 pages.

Foreign Communication From a Counterpart Application, PCT Application No. PCT/CN2013/070139, English Translation of International Search Report dated Apr. 18, 2013, 2 pages.

Foreign Communication From a Counterpart Application, PCT Application No. PCT/CN2013/070139, English Translation of Written Opinion dated Apr. 18, 2013, 9 pages.

* cited by examiner

IMPROVING TRANSMISSION EFFICIENCY OF DATA FRAMES BY USING SHORTER ADDRESSES IN THE FRAME HEADER

CROSS-REFERENCE TO RELATED APPLICATIONS

This application is a continuation of international Application No. PCT/CN2013/070139, filed on Jan. 7, 2013, which claims priority to Chinese Patent Application No. 201210008967.5, filed on Jan. 12, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of wireless communications, and in particular, to a data communications method, apparatus, and system.

BACKGROUND

A wireless fidelity (WiFi) technology has been widely applied in various industries. The most basic network structure of the WiFi technology is an access point (AP) plus several stations (STA). The AP provides an access service for the STA. A radio signal is used as an interaction medium between the AP and the STA. The radio signal refers to a physical frame, and generally appears in a form of a physical layer convergence procedure (PLCP) protocol packet, including a packet header and a data part, where the data part is a Media Access Control (MAC) frame. Generally the MAC frame appears in the PLCP packet in a form of a MAC protocol data component or a MAC protocol data unit (MPDU).

In an existing standard, the MAC frame includes a MAC frame header, a body part, and a frame check sequence (FCS) part, where the body part is the data part. The MAC frame header generally includes a 2-byte frame control (FC) domain, a 2-byte Duration (length)/identifier (ID) subdomain, a multi-byte address subdomain, a 2-byte sequence control subdomain, a 2-byte quality of service (QoS) control subdomain, and a high throughput control subdomain. Therefore, the length of the MAC frame header generally reaches 24 bytes.

However, in an 802.11ah application scenario, for example, on a sensor network, an STA communicates with an AP very frequently, transmitted data amount is both small, possibly smaller than the MAC frame header, and a data transmission rate is very low on the sensor network. Therefore, when the MAC frame in the existing standard is used, the transmission efficiency is low, and an application requirement cannot be satisfied.

SUMMARY

Embodiments of the present invention provide a data communications method, apparatus, and system, which can improve the transmission efficiency of a data frame.

According to one aspect, a data communications method is provided, including: sending an association request message to an access point; receiving an association response message sent by the access point, where the association response message includes an association identifier; generating a data frame, where a format of the data frame is a simplified frame format, and a frame header of the data frame includes a source address and a destination address, where the length of the source address is shorter than the length of a MAC address, and the source address includes the association identifier, or the association identifier and a multicast unicast indicator, or the association identifier and a data type, or the association identifier, the data type, and the multicast unicast indicator; and sending the data frame to the access point.

According to another aspect, a data communications method is provided, including: receiving an association request message sent by a terminal; sending an association response message to the terminal, where the association response message includes an association identifier; receiving a data frame sent by the terminal, where a format of the data frame is a simplified frame format, and a frame header of the data frame includes a source address and a destination address, where the length of the source address is shorter than the length of a MAC address, and the source address includes the association identifier, or the association identifier and a multicast unicast indicator, or the association identifier and a data type, or the association identifier, the data type, and the multicast unicast indicator; and performing decoding processing according to the data frame.

According to another aspect, a data communications apparatus is provided, including a transceiver and at least one processor coupled to the transceiver. The transceiver is configured to send an association request message to an access point, and receive an association response message sent by the access point, where the association response message includes an association identifier; the processor is configured to generate a data frame, where a format of the data frame is a simplified frame format, and a frame header of the data frame includes a source address and a destination address, where the length of the source address is shorter than the length of a MAC address, and the source address includes the association identifier, or the association identifier and a multicast unicast indicator, or the association identifier and a data type, or the association identifier, the data type, and the multicast unicast indicator; and the transceiver is further configured to send the data frame to the access point.

According to another aspect, a data communications apparatus is provided, including a transceiver and at least one processor coupled to the transceiver. The transceiver is configured to receive an association request message sent by a terminal, send an association response message to the terminal, where the association response message includes an association identifier, and receive a data frame sent by the terminal, where a format of the data frame is a simplified frame format, and a frame header of the data frame includes a source address and a destination address, where the length of the source address is shorter than the length of a MAC address, and the source address includes the association identifier, or the association identifier and a multicast unicast indicator, or the association identifier and a data type, or the association identifier, the data type, and the multicast unicast indicator; and the processor is configured to perform decoding processing according to the data frame.

According to another aspect, a data communications system is provided, including any one of the foregoing apparatuses.

In embodiments of the present invention, because the length of the source address in the frame header of the data frame is shorter than the length of the MAC address, the length of the data frame compared with a data frame in the prior art can be reduced. Therefore, the transmission efficiency of the data frame can be improved.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
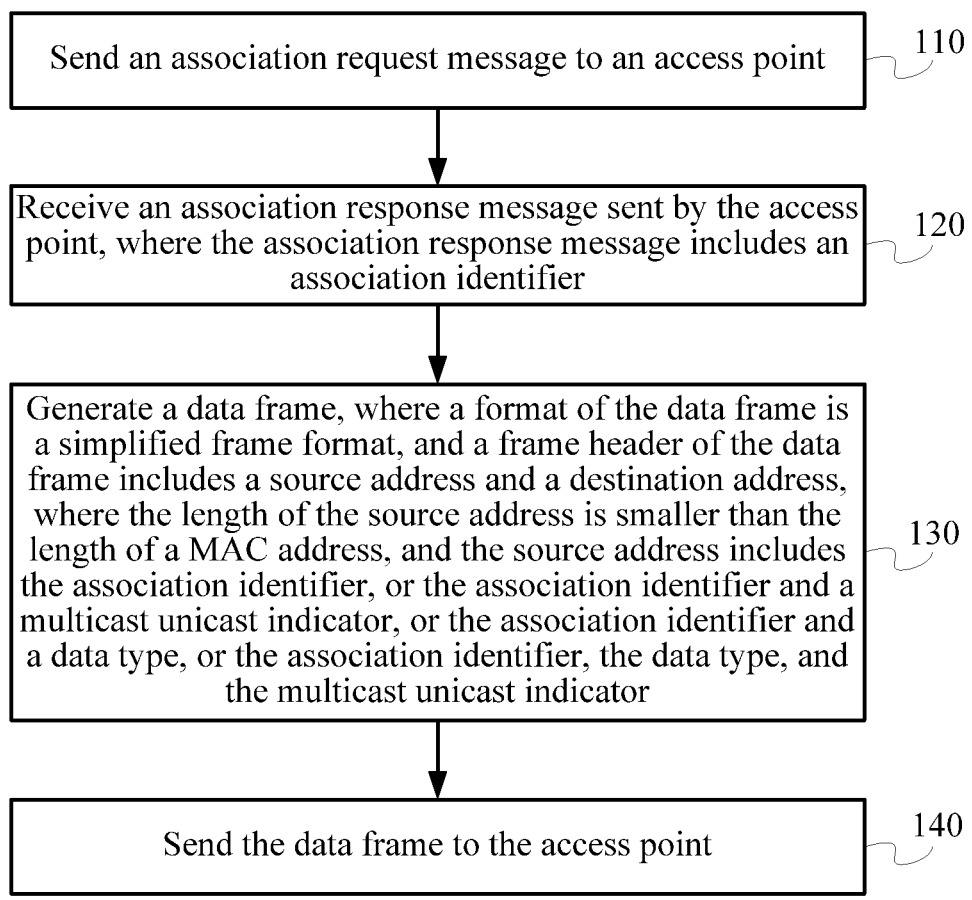
FIG. 1 is a schematic flowchart of a data communications method according to Embodiment 1 of the present invention.

FIG. 1 is a schematic flowchart of a data communications method according to Embodiment 1 of the present invention. The method in FIG. 1 is executed by a terminal, for example, may be executed by an STA in a WiFi technology.

110: Send an association request message to an access point.

120: Receive an association response message sent by the access point, where the association response message includes an association identifier (AID).

130: Generate a data frame, where a format of the data frame is a simplified frame format, and a frame header of the data frame includes a source address and a destination address, where the length of the source address is shorter than the length of a MAC address, and the source address includes the association identifier, or the association identifier and a multicast unicast indicator, or the association identifier and a data type, or the association identifier, the data type, and the multicast unicast indicator.

140: Send the data frame to the access point.

In the embodiment of the present invention, because the length of the source address in the frame header of the data frame is shorter than the length of the MAC address, the length of the data frame compared with a data frame in the prior art can be reduced. Therefore, a transmission rate of the data frame can be improved.

It should be understood that, in the embodiment of the present invention, the AID may refer to a unique identifier allocated by an AP to the STA on a basic service set (BSS) network, and it is a 16-bit sequence. However in an existing 802.11 standard, the maximum value of the AID is 2007, and therefore only 11 bits need to be used. In an application scenario of 802.11ah, one AP serves up to 6000 STAs. Here, the AID may use 13 bits to indicate 213=8192 STAs, and an application requirement may be satisfied. In the embodiment of the present invention, the existing AID may also not be used, but short address information additionally used for addressing is carried in the association response message, or a transmission stream identifier shorter than the MAC address may be used in the simplified frame format, and so on; and one terminal may have the multiple transmission stream identifiers, that is, each transmission stream may replace the MAC address with a short address for addressing. In the embodiment of the present invention, the information used for addressing and shorter than the MAC address is all referred to as the association identifier, which is abbreviated as AID. It should be understood that, the following AID or association identifier is not limited to the AID or association identifier in an existing standard, and the association request message and association response message are not limited to the association request message or association response message in the existing standard.

It should be noted that, the source address is an address of the terminal that generates the data frame, and the destination address herein refers to an address of the access point. In some cases, it is possible that a terminal directly sends data to another terminal, and then both the source address and the destination address may be an address of the corresponding terminal. If the access point sends the data frame to the terminal, the destination address is the address of the terminal, and the source address is the address of the access point. The address of the terminal may be set to 16 bits, where a fourteenth bit and a fifteenth bit indicate the data type. For example, "00" is used to indicate best-effort common data, "01" indicates voice data, and a thirteenth bit indicates multicast or unicast. If the access point sends the data frame to the terminal, the thirteenth bit in the address of the terminal is "1", it indicates that a frame currently transmitted is a multicast frame, and a zeroth bit to a twelfth bit in the address of the terminal are not all "1", it indicates a specific multicast address, and that a receiver of the data frame is a group of terminals but not a single terminal. The multicast address is not the AID, and for how to determine a value of the multicast address, reference may be made to the prior art or another related technology, which is not limited by the present invention. If the address of the terminal is the destination address and the zeroth bit to the thirteenth bit in the address of the terminal are all "1", it indicates that the data frame currently transmitted is a broadcast frame, and at this time the address where zeroth bit to the twelfth bit are all "1" may be considered as a special multicast address. The special multicast is broadcast, and the receivers of a broadcast frame are all terminals on a network where the access point is located. When the thirteenth bit in the address of the terminal is "0", the zeroth bit to the twelfth bit in the address of the terminal are low-order 13 bits of the AID allocated by the access point to the terminal. When the address of such a terminal is the destination address, the receiver of the data frame is the terminal indicated by the AID in the address of the terminal. Therefore, the thirteenth bit in the address of the terminal is a multicast unicast indicator bit. When the address of the terminal is the source address, the STA generally sets the source address to a unicast address, which includes the AID of the terminal. When the address of the terminal is the destination address, the address of the terminal may be the unicast address or the multicast address, and includes the AID of the terminal when the address of the terminal is the unicast address. Definitely, the low-order 13 bits of the AID, the multicast unicast indicator bit, and a data type indicator bit may form the source address in any combination manner, which is not limited to the foregoing combination manners. At the same time, the source address may also include only the AID, or include only the AID/multicast address and multicast unicast indicator, or include only the AID and data type, or include the three pieces of information. The address of the terminal is not limited to 16 bits, may be defined to another length as required, and some undefined reserved bits may be reserved. The number of significant bits of the AID may be another number of bits, for example, may be 14 bits or 12 bits, and so on. The length of the data type may also be another number of bits, for example, may be 3 bits or more, to indicate serial numbers of more data types, transmission types, or data streams. In the embodiment of the present invention, for ease of description, a serial number or identifier of a data type, transmission type, and data stream are all referred to as a data type.

Optionally, as a supplement or an exception, in step 130, the length of the destination address is shorter than the length of the MAC address of the access point, and the destination address is a hash value of the MAC address of the access point. In the embodiment of the present invention, the destination address here refers to the address of the access point. It may be understood that, if the access point sends the data frame to the terminal, the source address in the data frame is the address of the access point. The length of the address of the access point is shorter than the length of the MAC address of the access point, and the address of the access point may be a hash value of the MAC address of the access point. For example, after a hash operation is performed on the MAC address of the access point, 16 bits in the MAC address is used as the destination address. In this way, the length of the destination address is much shorter than the length (48 bits) of the MAC address. Definitely, the hash value may also be another length shorter than the length of the MAC address, which is not limited by the embodiment of the present invention.

In the embodiment of the present invention, because the destination address in the frame header of the data frame is the hash value of the MAC address of the access point, and the length is shorter than the length of the MAC address, the length of the frame header of the data frame can be reduced. Therefore, a transmission rate of the data frame can be improved.

Optionally, as a supplement or an exception, in step 130, the frame header may further include an FC domain. The FC domain may include a protocol version subdomain. The protocol version subdomain may be used to indicate a non-simplified frame format or the simplified frame format.

In the embodiment of the present invention, the simplified frame format indicates that, at least an address value including the AID of the terminal and shorter than the MAC address is used as the address of the terminal; a hash value that is of the MAC address of the access point and shorter than the MAC address may further be used as the address of the access point but the MAC address of the access point is not used; and the following simplified method may be further included. The non-simplified frame format indicates a frame format in which the MAC addresses of the terminal and access point are directly used in a frame, that is, the method in the embodiment of the present invention is not adopted to reduce the length of the frame. For example, the length of the protocol version subdomain may be 2 bits. When a value is "00", it may indicate that the format of the data frame is the non-simplified frame format, for example, a MAC frame format in an existing standard; when the value is "01", it may indicate that the format of the data frame is the simplified frame format. Other values are reserved values, and are used to indicate the frame formats of other versions. It should be understood that in the embodiments of the present invention, the non-simplified frame format may include a data frame format in the existing standard, and may also include other data frame formats whose length is longer than that of the data frame in the embodiment of the present invention.

Optionally, as a supplement or an exception, in step 130, the frame header may further include an FC domain. The FC domain may include a simplified frame format indicator subdomain. The simplified frame format indicator subdomain is used to indicate the non-simplified frame format or the simplified frame format. For example, the length of the simplified frame format indicator subdomain may be 1 bit. When a value is "0", it may indicate that a format of the data frame is the non-simplified frame format; when the value is "1", it may indicate that the format of the data frame is the simplified frame format.

Optionally, as a supplement or an exception, in step 130, the frame header may further include an FC domain. The FC domain includes a subtype subdomain of the data frame, and does not include a frame type subdomain. The subtype subdomain of the data frame is used to indicate a subtype of the data frame. For example, whether the subtype is a data frame with QoS, or whether the subtype is a contention free poll (CF-Poll) data frame, and so on. In a MAC frame in an existing standard, a frame type subdomain is used to indicate types of a frame, including data frame, management frame, and control frame. In the embodiment of the present invention, if the simplified frame format is used only for the data frame, that is, it is determined that the data frame is transmitted. Therefore, in the FC domain, the frame type subdomain may be not included. Definitely, the simplified frame format may further be used for other frame types such as the management frame and the control frame, and the frame type subdomain needs to be included in the FC domain.

In the embodiment of the present invention, the FC domain of the frame header of the data frame does not include the frame type subdomain, and the length of the data frame compared with a MAC frame in the existing standard may be reduced. Therefore, the transmission efficiency of the data frame can be improved.

Optionally, as a supplement or an exception, in step 130, the frame header may further include an FC domain. The FC domain may include a frame transmission direction subdomain. The length of the frame transmission direction subdomain is 1 bit, and is used to indicate a transmission direction of the data frame. For example, when a value of the frame transmission direction subdomain is "0", it may indicate that the transmission direction of the data frame is from the terminal to the access point. When the value of the frame transmission direction subdomain is "1", it may indicate that the transmission direction of the data frame is from the access point to the terminal. Compared with a MAC frame in the prior art, which uses 2 bits to indicate the transmission direction of the data frame, the length can be shortened by 1 bit.

Optionally, as a supplement or an exception, in step 110, the association request message may further include first information used to request to use the simplified frame format. The association response message may further include second information used to instruct the simplified frame format to be used. For example, the terminal may, by using the association request message, send a request to use the simplified frame format to the access point. If determining that the simplified frame format may be used, the access point may, by using the association response message, instruct the terminal to use the simplified frame format.

Optionally, as a supplement or an exception, the terminal may send a first message to the access point, where the first message may include the first information used to request to use the simplified frame format, and may receive a second message sent by the access point, where the second message may include the second information used to instruct the simplified frame format to be used. The terminal may, by using the first message different from the association request message, send a request to use the simplified frame format to the access point, and may receive the second message different from the association response message and sent by the access point to instruct the terminal to use the simplified frame format.

Optionally, as a supplement or an exception, the first information may further be used to instruct the frame header not to carry a portion that is of a transmission parameter and remains unchanged during data transmission. The portion that is of the transmission parameter and remains unchanged during data transmission may include at least one of the following: a data frame length subdomain and a QoS parameter subdomain.

The data frame length subdomain may indicate the data length, and the QoS parameter subdomain indicates a QoS parameter. During the data transmission of the terminal and the access point, the data length and the QoS parameter may remain unchanged, so that the frame header may not carry the data frame length subdomain and the QoS parameter subdomain.

In the embodiment of the present invention, the frame header of the data frame does not carry the portion that is of the transmission parameter and remains unchanged during the data transmission, and the length of the data frame may be reduced. Therefore, the transmission efficiency of the data frame can be improved.

Optionally, as a supplement or an exception, the first information may further be used to instruct whether to encrypt the data frame. Whether to encrypt the data frame is instructed in the first information, and therefore the frame header of the data frame may not include a frame protection indicator subdomain. This can reduce the length of the data frame.

Embodiment 2

Figure 2:
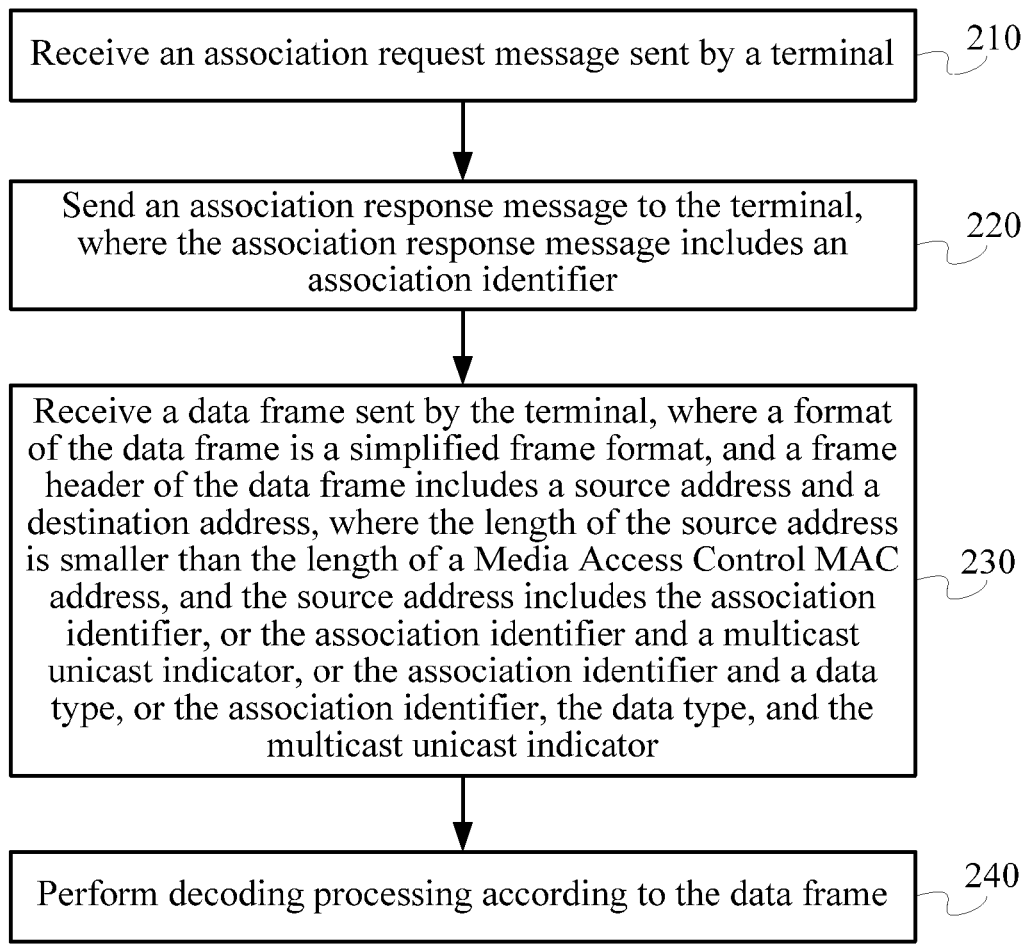
FIG. 2 is a schematic flowchart of a data communications method according to Embodiment 2 of the present invention.

FIG. 2 is a schematic flowchart of a data communications method according to Embodiment 2 of the present invention.

The method in FIG. 2 is executed by an access point, for example, may be executed by an AP in a WiFi technology.

210: Receive an association request message sent by a terminal.

220: Send an association response message to the terminal, where the association response message includes an association identifier.

230: Receive a data frame sent by the terminal, where a format of the data frame is a simplified frame format, and a frame header of the data frame includes a source address and a destination address, where the length of the source address is shorter than the length of a MAC address, and the source address includes the association identifier, or the association identifier and a multicast unicast indicator, or the association identifier and a data type, or the association identifier, the data type, and the multicast unicast indicator.

240: Perform decoding processing according to the data frame.

In the embodiment of the present invention, because the length of the source address in the frame header of the data frame is shorter than the length of the MAC address, the length of the data frame compared with a data frame in the prior art can be reduced. Therefore, the transmission efficiency of the data frame can be improved.

Optionally, as a supplement or an exception, in step 240, the access point may obtain the destination address included in the frame header, where the length of the destination address is shorter than the length of the MAC address of the access point, and the destination address may be a hash value of the MAC address of the access point. For example, after a hash operation is performed on the MAC address of the access point, 16 bits of the MAC address may be used as the destination address. In this way, the length of the destination address is much shorter than the length (48 bits) of the MAC address. Definitely, the hash value may also be another length shorter than the length of the MAC address, which is not limited by the embodiments of the present invention.

In the embodiments of the present invention, because the destination address in the frame header of the data frame is the hash value of the MAC address of the access point, and the length is shorter than the length of the MAC address, the length of the frame header of the data frame can be reduced. Therefore, the transmission efficiency of the data frame can be improved.

Optionally, as a supplement or an exception, in step 240, the access point may obtain an FC domain included in the frame header. The FC domain may include a protocol version subdomain. The protocol version subdomain may be used to indicate a non-simplified frame format or the simplified frame format. For example, the length of the protocol version subdomain may be 2 bits. When a value is "00", it may indicate that the format of the data frame is the non-simplified frame format, for example, a MAC frame format in an existing standard; when the value is "01", it may indicate that the format of the data frame is the simplified frame format. Other values are reserved values, and used to indicate the frame formats of other versions. It should be understood that, in the embodiment of the present invention, the non-simplified frame format may include a data frame format in the existing standard, and may also include other data frame formats whose length is longer than that of the data frame in the embodiment of the present invention.

Optionally, as a supplement or an exception, in step 240, the access point may obtain an FC domain included in the frame header. The FC domain may include a simplified frame format indicator subdomain. The simplified frame format indicator subdomain is used to indicate the non-simplified frame format or the simplified frame format. For example, the length of the simplified frame format indicator subdomain may be 1 bit. When a value is "0", it may indicate that a format of the data frame is the non-simplified frame format; when the value is "1", it may indicate that the format of the data frame is the simplified frame format.

Optionally, as a supplement or an exception, in step 240, the access point may obtain an FC domain included in the frame header. The FC domain may include a subtype subdomain of the data frame, and does not include a frame type subdomain. The subtype subdomain of the data frame may be used to indicate a subtype of the data frame, for example, a CF-Poll data frame and a QoS data frame. In a MAC frame in an existing standard, a frame type subdomain is used to indicate types of a frame, including data frame, management frame, and control frame. In the embodiment of the present invention, if the simplified frame format is used only for the data frame, that is, it is determined that the data frame is transmitted, and therefore the frame type subdomain may be not included in the FC domain. Definitely, the simplified frame format may further be used for other frame types such as the management frame and the control frame, and the frame type subdomain needs to be included in the FC domain.

In the embodiments of the present invention, the FC domain of the frame header of the data frame does not include the frame type subdomain, and the length of the data frame compared with a MAC frame in the existing standard can be reduced. Therefore, the transmission efficiency of the data frame can be improved.

Optionally, as a supplement or an exception, in step 240, the access point may obtain an FC domain included in the frame header. The FC domain may include a frame transmission direction subdomain. The length of the frame transmission direction subdomain is 1 bit, and may be used to indicate a transmission direction of the data frame. For example, when a value of the frame transmission direction subdomain is "0", it may indicate that the transmission direction of the data frame is from the terminal to the access point. When the value of the frame transmission direction subdomain is "1", it may indicate that the transmission direction of the data frame is from the access point to the terminal. Compared with a MAC frame in the prior art, which uses 2 bits to indicate the transmission direction of the data frame, the length can be shortened by 1 bit.

Optionally, as a supplement or an exception, in step 210, the association request message may further include first information used to request to use the simplified frame format. An association response message may further include second information used to instruct the simplified frame format to be used. For example, the terminal may, by using the association request message, send a request to use the simplified frame format to the access point. If determining that the simplified frame format may be used, the access point may, by using the association response message, instruct the terminal to use the simplified frame format.

Optionally, as a supplement or an exception, the access point may receive a first message sent by the terminal. The first message may include the first information used to instruct the simplified frame format to be used. The access point may send a second message to the terminal. The second message may include the second information used to instruct the simplified frame format to be used. The terminal may, by using the first message different from the association request message, send a request to use the simplified frame format to the access point. The access point may, by using the second message different from the association response message, instruct the terminal to use the simplified frame format.

Optionally, as a supplement or an exception, first information may further be used to instruct the frame header not to carry a portion that is of a transmission parameter and remains unchanged during data transmission. The portion that is of the transmission parameter and remains unchanged during data transmission may include at least one of the following: a data frame length subdomain and a QoS parameter subdomain.

The data frame length subdomain may indicate the data length, and the QoS parameter subdomain indicates a QoS parameter. During the data transmission of the terminal and the access point, the data length and the QoS parameter may remain unchanged, so that the frame header may not carry the data frame length subdomain and the QoS parameter subdomain.

In the embodiment of the present invention, the frame header of the data frame does not carry the portion that is of the transmission parameter and remains unchanged during the data transmission, and therefore the length of the data frame can be reduced. Therefore, the transmission efficiency of the data frame can be improved.

Optionally, as a supplement or an exception, the first information may further be used to instruct whether to encrypt the data frame. Whether to encrypt the data frame is instructed in the first message, and therefore the frame header of the data frame may not include a frame protection indicator subdomain. This can reduce the length of the data frame.

Embodiment 3

Figure 3:
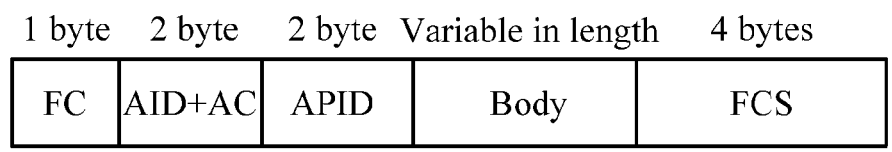
FIG. 3 is a schematic structural diagram of an example of a data frame according to Embodiment 3 of the present invention.

FIG. 3 is a schematic structural diagram of an example of a data frame according to Embodiment 3 of the present invention.

As shown in FIG. 3, the data frame includes: an FC domain, whose length is 1 byte; a source address formed by an AID and an access category (AC), whose length is 2 bytes, where the AC is related information about a data type; a destination address, which is an AP identification (APID) and is a hash value of a MAC address of an AP, and whose length is 2 bytes; a body part, which is a data part; and an FCS part, whose length is 4 bytes.

A frame header of the data frame includes the FC domain, the source address, and the destination address, and the length is 5 bytes. Compared with a MAC frame header whose length is 24 bytes in the prior art, the length is reduced by 19 bytes.

Therefore, in the embodiment of the present invention, because the length of the data frame is reduced, the transmission efficiency of the data frame can be improved.

Embodiment 4

Figure 4:
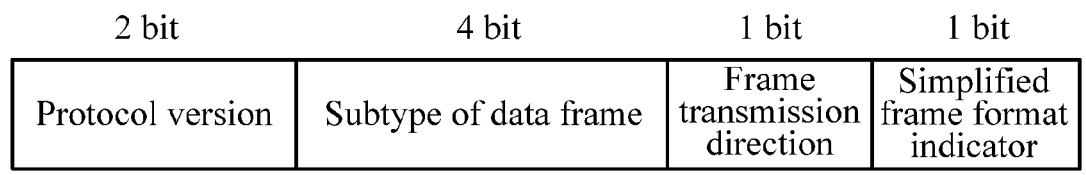
FIG. 4 is a schematic structural diagram of an example of an FC domain of a data frame according to Embodiment 4 of the present invention.

FIG. 4 is a schematic structural diagram of an example of an FC domain of a data frame according to Embodiment 4 of the present invention.

As shown in FIG. 4, the FC domain includes: a protocol version subdomain, whose length is 2 bits; a subtype subdomain, whose length is 4 bits; a frame transmission direction subdomain, whose length is 1 bit; and a simplified frame format indicator subdomain, whose length is 1 bit, and which may indicate a non-simplified frame format when a value is "0" and may indicate a simplified frame format when the value is "1".

Therefore, in the embodiment of the present invention, compared with an FC domain of a data frame in the prior art, the length is reduced by 1 byte, and therefore the transmission efficiency of the data frame can be improved.

Embodiment 5

Figure 5:
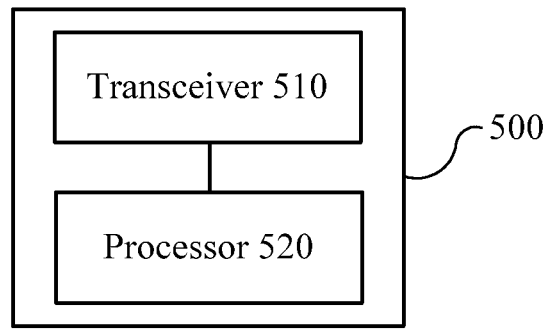
FIG. 5 is a block diagram of a data communications apparatus according to Embodiment 5 of the present invention.

FIG. 5 is a block diagram of a data communications apparatus according to Embodiment 5 of the present invention. An example of an apparatus 500 in FIG. 5 is a terminal, for example, may be an STA in a WiFi technology. The apparatus 500 includes a transceiver 510 and at least one processor 520. For ease of description, FIG. 5 describes only one processor, but there may be one or more processors in FIG. 5, which is not limited in the embodiment of the present invention.

The transceiver 510 is configured to send an association request message to an access point, and receive an association response message sent by the access point, where the association response message includes an association identifier. The processor 520 is configured to generate a data frame, where a format of the data frame is a simplified frame format, and a frame header of the data frame includes a source address and a destination address, where the length of the source address is shorter than the length of a MAC address, and the source address includes the association identifier, or the association identifier and a multicast unicast indicator, or the association identifier and a data type, or the association identifier, the data type, and the multicast unicast indicator. The transceiver 510 is further configured to send the data frame to the access point.

In the embodiment of the present invention, the length of the source address in the frame header of the data frame is shorter than the length of the MAC address, the length of the data frame compared with a data frame in the prior art may be reduced. Therefore, the transmission efficiency of the data frame can be improved.

Optionally, as a supplement or an exception, the length of the destination address is shorter than the length of the MAC address of the access point, and the destination address may be a hash value of the MAC address of the access point.

Optionally, as a supplement or an exception, the frame header of the data frame may further include an FC domain. The FC domain may include a protocol version subdomain. The protocol version subdomain may be used to indicate a non-simplified frame format or the simplified frame format.

Optionally, as a supplement or an exception, the frame header of the data frame may further include an FC domain. The FC domain may include a simplified frame format indicator subdomain. The simplified frame format indicator subdomain may be used to indicate the non-simplified frame format or the simplified frame format.

Optionally, as a supplement or an exception, the frame header of the data frame may further include an FC domain. The FC domain may include a subtype subdomain of the data frame, and does not include a frame type subdomain.

Optionally, as a supplement or an exception, the frame header of the data frame may further include an FC domain. The FC domain may include a frame transmission direction subdomain. The length of the frame transmission direction subdomain is 1 bit, and may be used to indicate a transmission direction of the data frame.

Optionally, as a supplement or an exception, the association request message may further include first information used to request to use the simplified frame format. The association response message may further include second information used to instruct the simplified frame format to be used.

Optionally, as a supplement or an exception, the transceiver 510 is further configured to send a first message to the access point, where the first message may include the first information used to request to use the simplified frame format; and receive a second message sent by the access point, where the second message may include the second information used to instruct the simplified frame format to be used.

Optionally, as a supplement or an exception, the first information may further be used to instruct the frame header not to carry a portion that is of a transmission parameter and remains unchanged during data transmission. The portion that is of the transmission parameter and remains unchanged during data transmission may include at least one of the following: a data frame length subdomain and a QoS parameter subdomain.

Optionally, as a supplement or an exception, the first information may further be used to instruct whether to encrypt the data frame.

For each hardware of the apparatus 500 or an operation performed cooperatively by the hardware and corresponding software, reference may be made to 110, 120, 130, and 140 of the method of the Embodiment 1. To avoid repetition, description is not provided again herein.

In addition, a computer readable media (or medium) is further provided, including computer readable instructions when being executed to perform the following operations: the operations of 110, 120, 130, and 140 for executing the method in the Embodiment 1.

In addition, a computer program product is further provided, including the computer readable medium.

It should be noted that, the terminal involved in the embodiment of the present invention includes, but not limited to, electronic equipment with a wireless communications function, such as a mobile phone, mobile phone, portable computer, and tablet computer.

Embodiment 6

Figure 6:
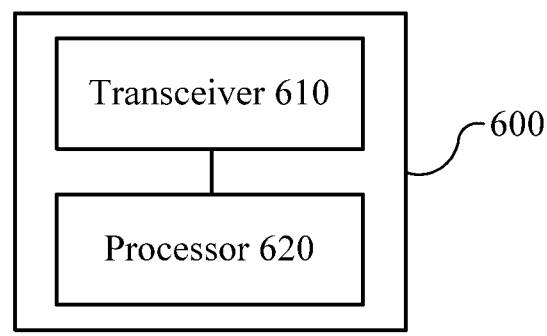
FIG. 6 is a block diagram of a data communications apparatus according to Embodiment 6 of the present invention.

FIG. 6 is a block diagram of a data communications apparatus according to Embodiment 6 of the present invention. An example of an apparatus 600 in FIG. 6 is an access point, for example, may be an AP in a WiFi technology. The apparatus 600 includes a transceiver 610 and at least one processor 620. For ease of description, FIG. 6 describes only one processor, but there may be one or more processors in FIG. 6, which is not limited in the embodiment of the present invention.

The transceiver 610 is configured to receive an association request message sent by a terminal; send an association response message to the terminal, where the association response message includes an association identifier; and receive a data frame sent by the terminal, where a format of the data frame is a simplified frame format, and a frame header of the data frame includes a source address and a destination address, where the length of the source address is shorter than the length of a MAC address, and the source address includes the association identifier, or the association identifier and a multicast unicast indicator, or the association identifier and a data type, or the association identifier, the data type, and the multicast unicast indicator. The processor 620 is configured to perform decoding processing according to the data frame.

In the embodiment of the present invention, because the length of the source address in the frame header of the data frame is shorter than the length of the MAC address, the length of the data frame compared with a data frame in the prior art can be reduced. Therefore, the transmission efficiency of the data frame can be improved.

Optionally, as a supplement or an exception, the processor 620 is further configured to obtain the destination address included in the frame header, where the length of the destination address is shorter than the length of the MAC address of the access point, and the destination address may be a hash value of the MAC address of the access point.

Optionally, as a supplement or an exception, the processor 620 is further configured to obtain an FC domain included in the frame header. The FC domain may include a protocol version subdomain. The protocol version subdomain may be used to indicate a non-simplified frame format or the simplified frame format.

Optionally, as a supplement or an exception, the processor 620 is further configured to obtain an FC domain included in the frame header. The FC domain may include a simplified frame format indicator subdomain. The simplified frame format indicator subdomain may be used to indicate the non-simplified frame format or the simplified frame format.

Optionally, as a supplement or an exception, the processor 620 is further configured to obtain an FC domain included in the frame header. The FC domain may include a subtype subdomain of the data frame, and does not include a frame type subdomain.

Optionally, as a supplement or an exception, the processor 620 is further configured to obtain an FC domain included in the frame header. The FC domain may include a frame transmission direction subdomain. The length of the frame transmission direction subdomain is 1 bit, and is used to indicate a transmission direction of the data frame.

Optionally, as a supplement or an exception, the association request message may further include first information used to request to use the simplified frame format. The association response message may further include second information used to instruct the simplified frame format to be used.

Optionally, as a supplement or an exception, the transceiver 610 is further configured to receive a first message sent by the terminal, where the first message may include the first information used to request to use the simplified frame format; and send a second message to the terminal, where the second message may include the second information used to instruct the simplified frame format to be used.

Optionally, as a supplement or an exception, the first information may further be used to instruct the frame header not to carry a portion that is of a transmission parameter and remains unchanged during data transmission. The portion that is of the transmission parameter and remains unchanged during data transmission includes at least one of the following: a data frame length subdomain and a QoS parameter subdomain.

Optionally, as a supplement or an exception, the first information may further be used to instruct whether to encrypt the data frame.

For each hardware of the apparatus 600 or an operation performed cooperatively by the hardware and corresponding software, reference may be made to 210, 220, 230, and 240 of the method of the Embodiment 2. To avoid repetition, description is not provided again herein.

In addition, a computing readable media (or medium) is further provided, including computer readable instructions when being executed to perform the following operations: the operations of 210, 220, 230, and 240 for executing the method in the Embodiment 2.

In addition, a computer program product is further provided, including the computer readable medium.

It should be noted that, the access point involved in the embodiments of the present invention includes, but not limited to, equipment with an AP function in a WiFi technology.

Embodiment 7

Figure 7:
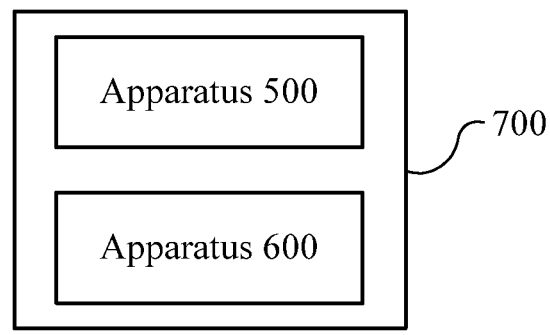
FIG. 7 is a block diagram of a data communications system according to Embodiment 7 of the present invention.

FIG. 7 is a block diagram of a data communications system according to Embodiment 7 of the present invention. A system 700 in FIG. 7 includes the apparatus 500 and/or the apparatus 600.

For each hardware of the system 700 or an operation performed cooperatively by the hardware and corresponding software, reference may be made to the Embodiment 5 and/or Embodiment 6. To avoid repetition, description is not provided again herein.

In the embodiment of the present invention, because the length of the source address in the frame header of the data frame is shorter than the length of the MAC address, the length of the data frame compared with a data frame in the prior art can be reduced. Therefore, the transmission efficiency of the data frame can be improved.

A person of ordinary skill in the art may be aware that, in combination with the examples described in the embodiments disclosed in this specification, components or units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and component or unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the component division is merely logical function division and may be other division in actual implementation. For example, a plurality of components or components may be combined or integrated into another system, or some features may be ignored or not performed. In addition, the displayed or discussed mutual couplings or direct couplings or communication connections may be implemented through some interfaces. The indirect couplings or communication connections between the apparatuses or components may be implemented in electronic, mechanical, or other forms.

In addition, function components in the embodiments of the present invention may be integrated into a processing component, or each of the components may exist alone physically, or two or more components are integrated into a component.

When the functions are implemented in a form of a software functional component and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer apparatus (which may be a personal computer, a server, or a network apparatus) to perform all or a part of the steps of the methods described in the embodiment of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A data communications method for establishing a wireless fidelity (WiFi) connection, the method comprising:
   sending, by a station, an association request message to an access point, wherein the association request message comprises a first source address and a first destination address;
   receiving, by the station, an association response message comprising an association identifier (AID) from the access point, wherein the AID is a unique identifier allocated by the access point to the station, and wherein a bit length of the AID is shorter than a bit length of the first source address;
   generating, by the station, a data frame, wherein a format of the data frame is a simplified frame format that is different from a format of the association request message, wherein a frame header of the data frame comprises a second source address, a second destination address, and a frame control (FC) domain, wherein the FC domain comprises a frame transmission direction subdomain, and wherein the frame transmission direction subdomain has a length of one bit and wherein the frame transmission direction subdomain is used to indicate a transmission direction of the data frame, wherein the AID is used as the second source address of the frame header, and wherein a bit length of the second source address as the AID is shorter than a bit length of the first source address; and
   sending, by the station, the data frame to the access point.

2. The method according to claim 1, wherein the FC domain further comprises a protocol version subdomain, and wherein the protocol version subdomain is used to indicate a non-simplified frame format or the simplified frame format.

3. The method according to claim 1, wherein the association request message further comprises first information used to request to use the simplified frame format, and wherein the association response message further comprises second information used to instruct the simplified frame format to be used.

4. A data communications method for establishing a wireless fidelity (WiFi) connection, the method comprising:
   receiving, by an access point, an association request message from a terminal, wherein the association request message comprises a first source address and a first destination address;
   sending, by the access point, an association response message comprising an association identifier (AID) to the terminal, wherein the AID is a unique identifier allocated by the access point to the terminal, and wherein a bit length of the AID is shorter than a bit length of the first source address;
   receiving, by the access point, a data frame from the terminal, wherein a format of the data frame is a simplified frame format that is different from a format of the association request message, wherein a frame header of the data frame comprises a second source address and a second destination address, wherein the AID is used as the second source address of the frame header, and wherein a bit length of the second source address as the AID is shorter than a bit length of the first source address; and
   performing, by the access point, decoding processing according to the data frame comprising obtaining a frame control (FC) domain comprised in the frame header, wherein the FC domain comprises a protocol version subdomain, and wherein the protocol version subdomain is used to indicate a non-simplified frame format or the simplified frame format.

5. The method according to claim 4, wherein the FC domain further comprises a protocol version subdomain, and wherein the protocol version subdomain is used to indicate a non-simplified frame format or the simplified frame format.

6. The method according to claim 4, wherein the association request message further comprises first information used to request to use the simplified frame format, and wherein the association response message further comprises second information used to instruct the simplified frame format to be used.

7. A data communications apparatus, comprising:
   a transceiver; and
   at least one processor coupled to the transceiver,
   wherein the transceiver is configured to:
      send an association request message to an access point; and
      receive an association response message from the access point,
   wherein the association request message comprises a first source address and a first destination address,
      wherein the association response message comprises an association identifier (AID) that is a unique identifier allocated by the access point to the data communications apparatus, wherein a bit length of the AID is shorter than a bit length of the first source address,
      wherein the processor is configured to generate a data frame,
   wherein a format of the data frame is a simplified frame format that is different from a format of the association request message, and a frame header of the data frame comprises a second source address, a second destination address, and a frame control (FC) domain, wherein the FC domain comprises a frame transmission direction subdomain, and wherein the frame transmission direction subdomain has a length of one bit and wherein the frame transmission direction subdomain is used to indicate a transmission direction of the data frame, wherein the AID is used as the second source address of the frame header and wherein a length of the second source address as the AID is shorter than a bit length of the first source address, and wherein the transceiver is further configured to send the data frame to the access point.

8. The apparatus according to claim 7, wherein the FC domain further comprises a protocol version subdomain, and wherein the protocol version subdomain is used to indicate a non-simplified frame format or the simplified frame format.

9. The apparatus according to claim 7, wherein the association request message further comprises first information used to request to use the simplified frame format, and wherein the association response message further comprises second information used to instruct the simplified frame format to be used.

10. A data communications apparatus, comprising:
a transceiver; and
at least one processor coupled to the transceiver,
wherein the transceiver is configured to:
receive an association request message from a terminal, wherein the association request message comprises a first source address and a first destination address;
send an association response message to the terminal, wherein the association response message comprises an association identifier (AID) that is a unique identifier allocated by the data communications apparatus to the terminal and a bit length of the AID is shorter than a bit length of the first source address; and
receive a data frame from the terminal,
wherein a format of the data frame is a simplified frame format that is different from a format of the association request message,
wherein a frame header of the data frame comprises a second source address and a second destination address,
wherein the AID is used as the second source address, and
wherein a bit length of the second source address as the AID is shorter than a bit length of the first source address, and
wherein the processor is configured to:
obtain a frame control (FC) domain comprised in the frame header, wherein the FC domain comprises a frame transmission direction subdomain, wherein the frame transmission direction subdomain has a length of one bit and wherein the frame transmission direction subdomain is used to indicate a transmission direction of the data frame, and
perform decoding processing according to the data frame.

11. The apparatus according to claim 10, wherein the processor is further configured to obtain a frame control (FC) domain comprised in the frame header, wherein the FC domain comprises a protocol version subdomain, and wherein the protocol version subdomain is used to indicate a non-simplified frame format or the simplified frame format.

12. The apparatus according to claim 10, wherein the association request message further comprises first information used to request to use the simplified frame format, and wherein the association response message further comprises second information used to instruct the simplified frame format to be used.

13. The method according to claim 1, further comprising:
sending a first message to the access point, wherein the first message comprises first information used to request to use the simplified frame format; and
receiving a second message from the access point, wherein the second message comprises second information used to instruct the simplified frame format to be used.

14. The method according to claim 3, wherein the first information is further used to instruct the frame header not to carry a portion that is of a transmission parameter and remains unchanged during data transmission, and the portion that is of the transmission parameter and remains unchanged during data transmission comprises at least one of the following: a data frame length subdomain and a quality of service (QoS) parameter subdomain.

15. The method according to claim 4, further comprising:
receiving a first message from the terminal, wherein the first message comprises first information used to request to use the simplified frame format; and
sending a second message to the terminal, wherein the second message comprises second information used to instruct the simplified frame format to be used.

16. The apparatus according to claim 9, further comprising:
wherein the first information is further used to instruct the frame header not to carry a portion that is of a transmission parameter and remains unchanged during data transmission, and the portion that is of the transmission parameter and remains unchanged during data transmission comprises at least one of the following: a data frame length subdomain and a quality of service (QoS) parameter subdomain.

17. The apparatus according to claim 12, further comprising:
wherein the first information is further used to instruct the frame header not to carry a portion that is of a transmission parameter and remains unchanged during data transmission, and the portion that is of the transmission parameter and remains unchanged during data transmission comprises at least one of the following: a data frame length subdomain and a quality of service (QoS) parameter subdomain.

* * * * *

UNITED STATES PATENT AND TRADEMARK OFFICE
CERTIFICATE OF CORRECTION

PATENT NO. : 9,906,491 B2  
APPLICATION NO. : 14/330238  
DATED : February 27, 2018  
INVENTOR(S) : Xiandong Dong et al.

Page 1 of 1

It is certified that error appears in the above-identified patent and that said Letters Patent is hereby corrected as shown below:

On the Title Page

Under item (56), Line 1, Other Publications should read:  
Wentink et al., Apparatus and Methods for Media Access Control Header Compression, U.S. Provisional Application No. 61/548,419 filed January 9, 2012.

Signed and Sealed this  
Tenth Day of April, 2018

Andrei Iancu  
*Director of the United States Patent and Trademark Office*